United States Patent
Jeon et al.

(10) Patent No.: US 12,386,521 B2
(45) Date of Patent: Aug. 12, 2025

(54) MEMORY SYSTEM RELATED TO SELECTIVELY STORING DATA AND A CORRESPONDING MAP, AND AN OPERATING METHOD OF THE MEMORY SYSTEM

(71) Applicant: SK hynix Inc., Icheon-si (KR)

(72) Inventors: Sung Hun Jeon, Icheon-si (KR); Tae Yeon Hwang, Icheon-si (KR); Kyung Hoon Lee, Icheon-si (KR); Sung Kwan Hong, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 6 days.

(21) Appl. No.: 18/314,710

(22) Filed: May 9, 2023

(65) Prior Publication Data

US 2024/0143193 A1 May 2, 2024

(30) Foreign Application Priority Data

Oct. 26, 2022 (KR) .................. 10-2022-0139564

(51) Int. Cl.
*G06F 3/06* (2006.01)
(52) U.S. Cl.
CPC ............ *G06F 3/0619* (2013.01); *G06F 3/064* (2013.01); *G06F 3/0673* (2013.01)

(58) Field of Classification Search
CPC ........... G06F 3/0619; G06F 2212/7201; G06F 2212/1016
See application file for complete search history.

(56) References Cited

U.S. PATENT DOCUMENTS

| 9,104,614 B2 | 8/2015 | Khmelnitsky |
| 2021/0318820 A1* | 10/2021 | Jin .................. G06F 3/061 |
| 2022/0206713 A1* | 6/2022 | Kim ................ G06F 3/0656 |
| 2023/0376228 A1* | 11/2023 | Cariello ........... G06F 3/0655 |

FOREIGN PATENT DOCUMENTS

KR 1020190118016 A 10/2019

* cited by examiner

*Primary Examiner* — Hosain T Alam
*Assistant Examiner* — Nicholas A. Paperno
(74) *Attorney, Agent, or Firm* — WILLIAM PARK & ASSOCIATES LTD.

(57) ABSTRACT

A memory system may include: a memory device including a plurality of memory blocks; and a memory controller. The memory controller is configured to store write data corresponding to a write request in a first memory block. When a map information update is required and the write request is a sequential write operation, the memory controller store, in a second memory block, store offset information related to a page of the first memory block in which the write data is lastly stored of a write data associated with a sequential write operation. The memory controller is configured to skip updating the map information of the write data associated with the sequential write operation.

16 Claims, 7 Drawing Sheets

Open block write Sequence

| Sequence | Pattern | Offset log | Map update |
|---|---|---|---|
| 1 | Sequential | 0×120 | Skip |
| 2 | Sequential | 0×250 | Skip |

(a)

| | 0 | 1 | 2 | 3 |
|---|---|---|---|---|
| SKIP INFORMATION | Offset 0×120 | Offset 0×250 | Empty | Empty |

SPO (b)

| | | | | |
|---|---|---|---|---|
| UPDATE INFORMATION | Offset 0×120 | Offset 0×250 | Empty | Empty |

Open block write Sequence

| Sequence | Pattern | Offset log | Map update |
|----------|------------|------------|------------|
| 1 | Sequential | 0×120 | Skip |
| 2 | Sequential | 0×250 | Skip |

(a)

|  | 0 | 1 | 2 | 3 |
|---|---|---|---|---|
| SKIP INFORMATION | Offset 0×120 | Offset 0×250 | Empty | Empty |

SPO (b)

| UPDATE INFORMATION | Offset 0×120 | Empty | Empty | Empty |
|---|---|---|---|---|

SPO (c)

FIG. 7

MEMORY SYSTEM RELATED TO SELECTIVELY STORING DATA AND A CORRESPONDING MAP, AND AN OPERATING METHOD OF THE MEMORY SYSTEM

CROSS-REFERENCE TO RELATED APPLICATION

The present application claims priority under 35 U.S.C. § 119(a) to Korean application number 10-2022-0139564, filed on Oct. 26, 2022, in the Korean Intellectual Property Office, which is incorporated herein by reference in its entirety.

BACKGROUND

1. Technical Field

The present technology relates to an electronic device, and more specifically, to a memory system related to selectively storing data and a corresponding map, and an operating method of the memory system.

2. Related Art

A data storage device is connected to the outside and performs a data input/output operation according to an external request. The outside may be, for example, a host.

The data storage device may store host data, user data, and external data in a block according to a request of a host, and store map information and meta information associated with the data in a separate block.

For efficient operation of the storage device, when a pattern of the host data is sequential or random, it is necessary to differentially operate an update method of associated map information and meta information.

SUMMARY

A memory system in accordance with an embodiment of the present technology may include: a memory device including a plurality of memory blocks; and a memory controller configured to receive a write request including a logical address from an outside, to store write data corresponding to the write request in a first memory block among the plurality of memory blocks, wherein when a map information update is required and the write request is a sequential write operation, to store, in a second memory block, offset information related to a page of the first memory block in which the write data is lastly stored.

An operating method of a memory system in accordance with an embodiment of the present technology may include: receiving, with a memory controller, a write request including a logical address from an outside; storing, in the memory controller, write data corresponding to the write request in a first memory block; determining, with the memory controller, whether a map information update is required for the data stored in the first memory block; and determining, with the memory controller, a pattern of the write request when the update is required; wherein when the pattern of the write request is a sequential write operation, the memory controller stores, in a second memory block, offset information related to a page of the first memory block in which the write data is lastly stored.

An operating method of a memory system in accordance with an embodiment of the present technology may include: reading, with a memory controller, first recovery information and second recovery information from a memory device in a sudden power off (SPO) recovery process; determining, with the memory controller, whether an update of map information corresponding to data stored in a first memory block of the memory device has been completed through the first recovery information and the second recovery information; selecting, with the memory controller, the first recovery information corresponding to data for which the map information update has not been completed, and updating the map information corresponding to the data stored in the first memory block according to offset information included in the selected first recovery information; and updating, with the memory controller, the map information and storing the updated map information in the second recovery information.

DETAILED DESCRIPTION

Hereinafter, embodiments of the present technology will be described in more detail with reference to the accompanying drawings.

Figure 1:
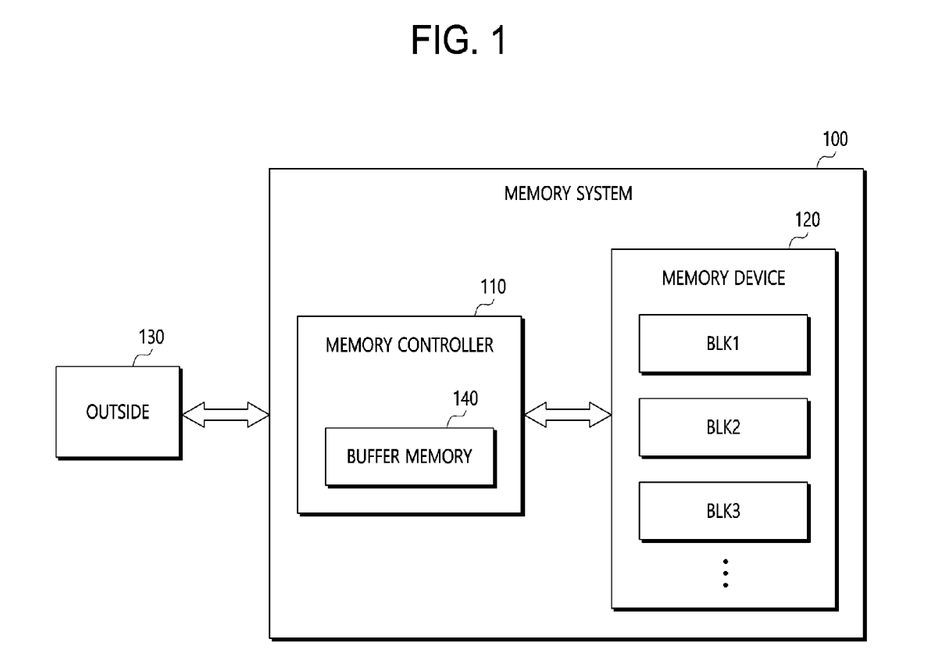
FIG. 1 is a configuration of a memory system in accordance with an embodiment.

FIG. 1 is a configuration of a memory system 100 in accordance with an embodiment.

Referring to FIG. 1, the memory system 100 in accordance with an embodiment may include a memory controller 110 and a memory device 120. The memory system 100 may include at least one of various information processing devices such as a personal computer, a laptop computer, a server, a workstation, a smart phone, and a tablet PC.

In an embodiment, the memory controller 110 may include a buffer memory 140.

The memory controller 110 may store data in the buffer memory 140 or provide data stored in the memory device 120 to an outside 130 according to a write request from the outside 130. In an embodiment, an outside 130 may be a host. However, the embodiments are not limited to merely a host and may be any element outside the memory system.

The memory device 120 may be implemented using a memory element selected from various nonvolatile memory elements such as a NAND flash memory, a NOR flash memory, a phase-change RAM (PRAM), a resistive RAM (ReRAM), a ferroelectric RAM (FRAM), and a spin torque transfer magnetic RAM (STT-MRAM). The memory device 120 may include a plurality of dies, a plurality of planes, a plurality of chips, or a plurality of packages. A memory cell constituting the memory device 120 may operate as a single-level cell that stores one-bit data in one memory cell, or a multi-level cell that stores multi-bit data in one memory cell.

The buffer memory 140 may serve as a space capable of storing data when the memory system 100 performs a series of operations such as writing or reading data in cooperation with the outside 130. Although FIG. 1 illustrates an example in which the buffer memory 140 is located inside the memory controller 110, it is of course that the buffer memory 140 may be provided outside the memory controller 110.

In an embodiment, the outside 130 and the memory system 100 may communicate with each other on the basis of an interface using at least one of various interface protocols such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, and an integrated drive electronics (IDE) protocol, and a private protocol.

In order to process a command received from the outside 130, the memory system 100 may divide and use a plurality of blocks BLK1, BLK2, BLK3, . . . in the memory device 120 according to use. In an embodiment, blocks BLK1, BLK2, BLK3, . . . may be referred to as memory blocks. For example, the plurality of blocks BLK1, BLK2, BLK3, . . . may be divided into a user data area for storing data received from the outside 130, a map area used for managing user data, and a meta area for storing data necessary for booting or operating the memory system 100, and an area for storing additional data necessary for efficiently operating the memory system 100 may exist. The meta area is an area for storing meta data read before an external write request is processed after booting of the memory system 100.

In an embodiment, the memory controller 110 may operate according to firmware provided for various operations of the memory system 100. In an embodiment, the memory controller 100 may perform functions of a flash translation layer (FTL) for managing the memory device 120, such as garbage collection, address mapping, and wear leveling. The memory controller 110 may be a combination of hardware and software operating on the hardware.

In an embodiment, in order to improve the performance of the memory system 100, the FTL may group the plurality of blocks BLK1, BLK2, BLK3, . . . into at least one block and use the grouped blocks as a super block, and may simultaneously operate a plurality of super blocks. A block allocated to store data or a block including an unprogrammed space (for example, a page) is referred to as an open block, and a block in which data is stored in all spaces thereof or a block in which no program occurs until the block is deleted is referred to as a closed block. The words "simultaneous" and "simultaneously" as used herein with respect to processes mean that the processes take place on overlapping intervals of time. For example, if a first process takes place over a first interval of time and a second process takes place simultaneously over a second interval of time, then the first and second intervals at least partially overlap each other such that there exists a time at which the first and second processes are both taking place.

Figure 2:
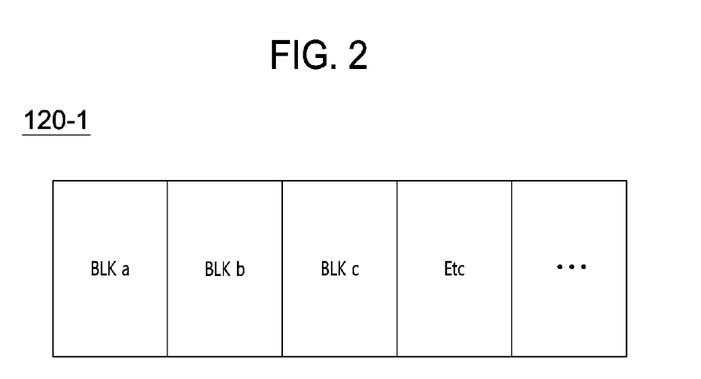
FIG. 2 is a configuration diagram of a memory areas in a memory device in accordance with an embodiment.

FIG. 2 is a configuration diagram of a memory areas in a memory device in accordance with an embodiment.

Referring to FIG. 2, a memory device 120-1 in accordance with an embodiment may include a plurality of dies, one or more planes included in each of the plurality of dies, and a plurality of memory blocks included in each of the planes, and each memory block may include a plurality of pages. In this drawing, representations of the die, the plane, and the page are omitted.

The memory controller 110 may divide and use a plurality of blocks of the memory device 120-1 into a plurality of areas BLKa, BLKb, BLKc, etc., . . . in order to efficiently manage the memory system 100. That is, each of the plurality of areas BLKa, BLKb, BLKc, etc. include at least one memory block. In order to store or read data requested from the outside 130, a first area BLKa, which is a part of the memory device 120-1, may be allocated for storing external data. A second area BLKb may be allocated for storing map information that is information on a physical location of user data stored in the memory device 120-1 and a logical location corresponding to the physical location. For the smooth operation of the memory system 100, a third area BLKc may be used as a log area for storing meta information managed by the memory controller 110, and other areas etc. may be used for storing additional information. The plurality of areas BLKa, BLKb, BLKc, etc., . . . may be flexibly changed and used, and blocks in substantially the same area may or might not be adjacent to each other.

Figure 3:
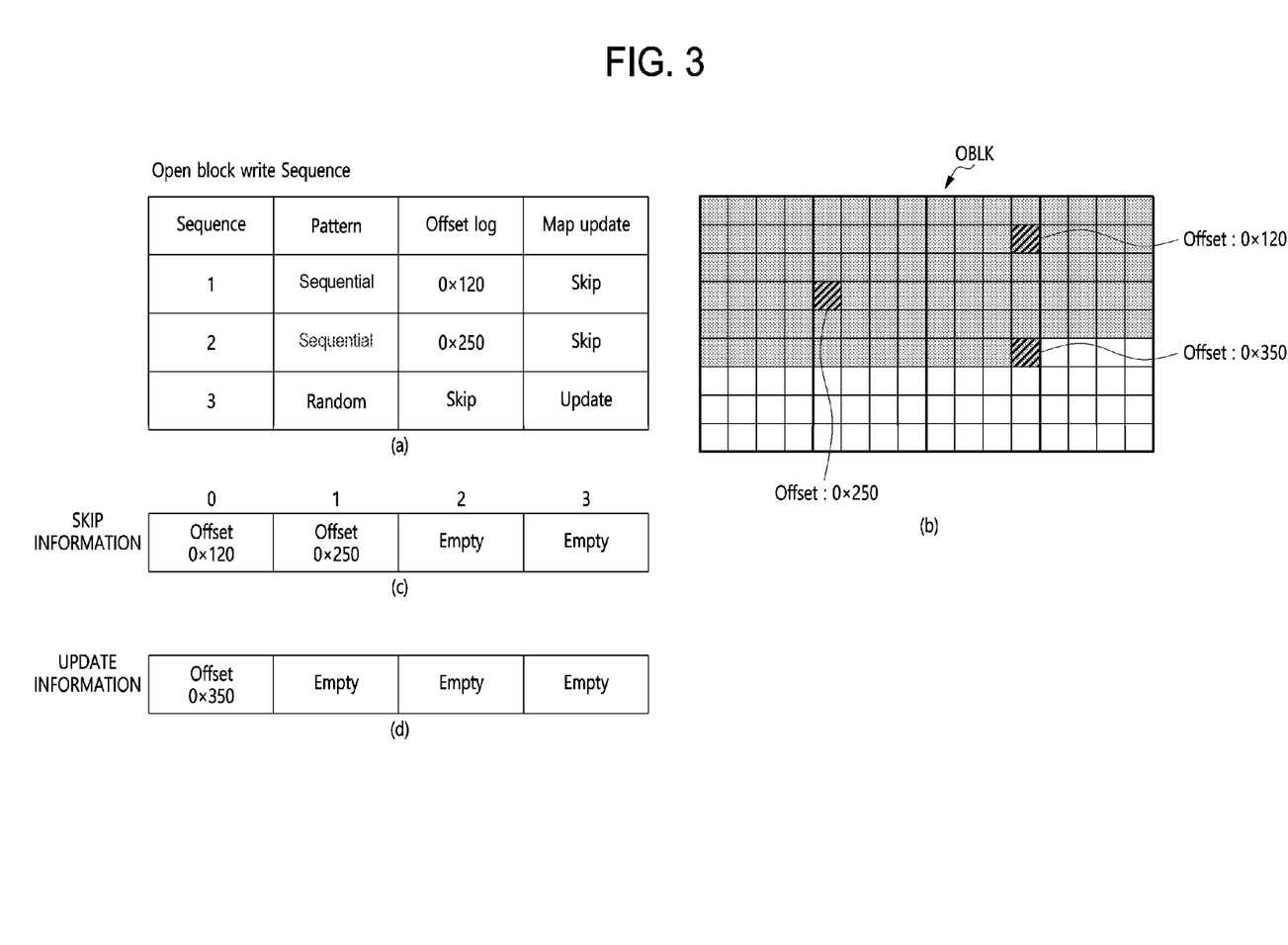
FIG. 3 and FIG. 4 are diagrams for explaining the concept of updating offset information and map information according to an external write sequence in accordance with an embodiment.
Figure 4:
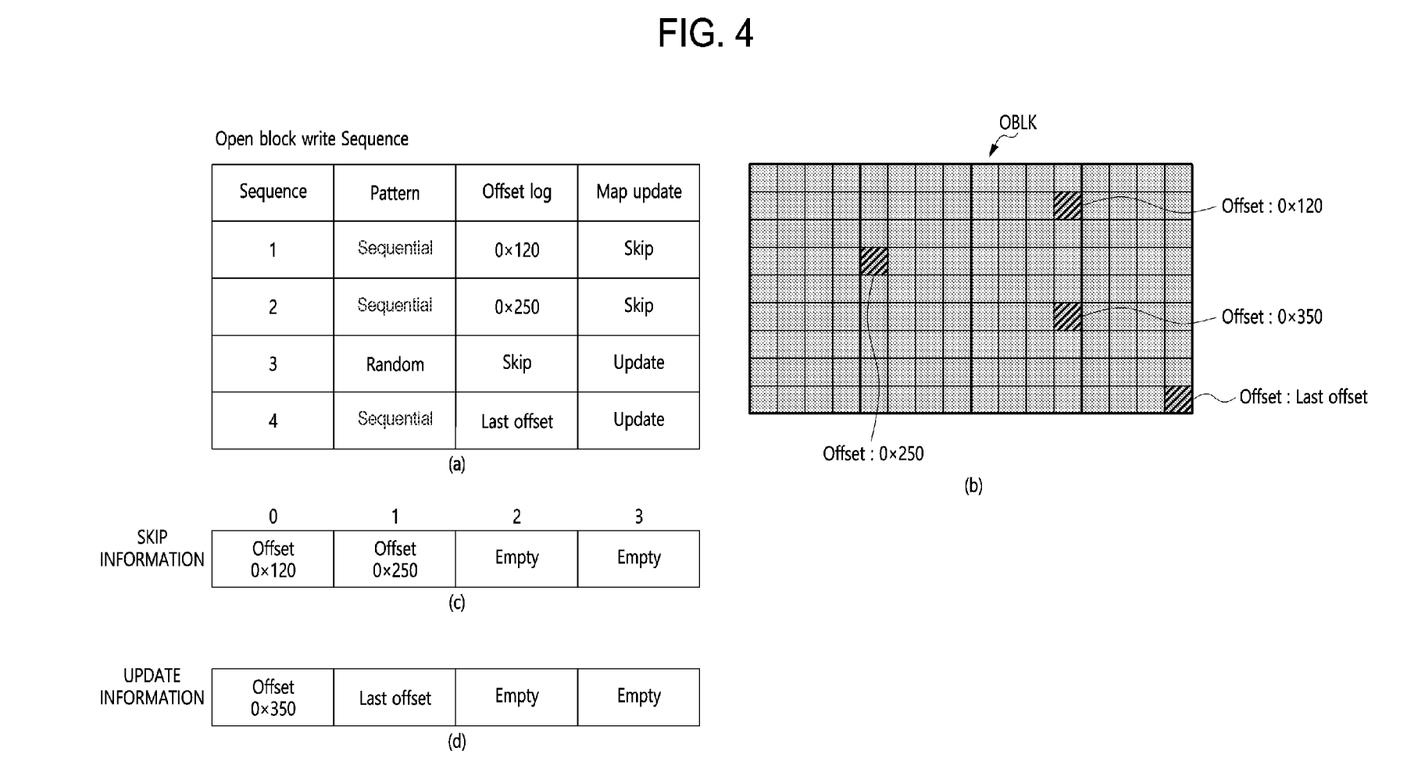

FIG. 3 and FIG. 4 are diagrams for explaining the concept of updating offset information and map information according to an external write sequence in accordance with an embodiment.

Referring to FIG. 3, the memory controller 110 may manage a write pattern included in a write command generated according to a write sequence as shown in (a) from the outside 130 and update or non-update of map information related to an open block ((b), OBLK) corresponding to the write pattern, by using skip information (c) and update information (d).

In a first write sequence Sequence 1, a write command including an offset 0x120 may be generated from the outside 130. The memory controller 110 may allocate the open block OBLK and program external data up to the offset 0x120. The memory controller 110 may determine whether it is time to update map data related to external data while data is being programmed in the memory device 120 or after the data programming is completed. In an embodiment, the memory controller 110 may determine whether a certain cycle has arrived for data written to the open block OBLK or whether a map information update is required, according to a preset map information update condition (S102).

In the present embodiment, the memory controller 110 may determine whether a map information update is required after the programming of external data to the open block OBLK is completed up to the offset 0x120. The update time point of the map information may affect the capacity of map information manageable by the memory controller 110 or the performance of the memory system 100. This is because processing of a request from the outside 130 may be delayed in order to perform map information update.

In an embodiment, when it is determined that a map information update is required, the memory controller 110 may determine whether to perform map information update according to a pattern of write data programmed immediately before. In an embodiment, the memory controller 110 may determine whether the pattern of the write data is a sequential pattern or a random pattern on the basis of the offset of the write data; however, the present technology is not limited thereto. In an embodiment, the pattern of the write data may be determined based on whether a logical address provided from the outside 130 for a write operation of the write data are contiguous or the size of the write data. A write operation for a sequential pattern may be a sequential write operation, and a write operation for a random pattern may be a random write operation.

In the present technology, after programming is completed up to the offset 0x120 according to the write command requested in the first write sequence Sequence 1, it is determined that a map information update is required, but when the external data is determined to be a sequential pattern, the map information update may be skipped without being separately performed. The memory controller 110 may store offset information 0x120, for which map information update has been skipped, in the skip information (c) to mean that the map information update operation has been skipped. That is, the skip information (c) may be information representing a state in which the memory controller 110 determines that a map information update is required after data is stored in the open block up to the offset 0x120 included in the write command, and determines the pattern of data completely written immediately before as a sequential pattern to skip the map information update. The skip information (c) may be stored in the buffer memory 140 while the memory system 100 is operating, and may also be stored in the memory devices 120 and 120-1 in preparation for power-off.

In the memory system 100, after the external data is stored up to the offset 0x120 of the open block OBLK, in a second write sequence Sequence 2, the outside 130 may generate a write command including an offset 0x250 to the memory system 100. The memory controller 110 may store the external data up to the offset 0x250 in the open block OBLK on the basis of the write command according to the second write sequence Sequence 2. The memory controller 110 may determine whether the time to update map information has arrived after the data is stored up to the offset 0x250. When it is determined that the time to update the map information arrives, but write data according to the second write sequence Sequence 2, that is, write data generated up to the offset 0x250 after the offset 0x120, is a sequential pattern, the memory controller 110 may skip the map information update operation and store offset information 0x250, for which map information update has been skipped, in the skip information (c).

In a third write sequence Sequence 3, the outside 130 may generate a write command including an offset 0x350 to the memory system 100, and the memory system 100 may store the external data up to the offset 0x350 in the open block OBLK. When it is determined that the time to update map information arrives after the data is stored up to the offset 0x350 in the open block OBLK and write data of the third write sequence Sequence 3 is a random pattern, the memory controller 110 may perform a map information update operation. In such a case, the memory controller 110 may update all map information for external data, for which no map information update has been made, by referring to the skip information (c). That is, the memory controller 110 in accordance with an embodiment of the present technology may skip map information update for write data of a sequential pattern and manage corresponding offset information by the skip information (c). Then, when write data of a random pattern is programmed and the time to update map information arrives, the memory controller 110 may update both map information on the write data of the random pattern and map information on the write data of the sequential pattern that has been previously written and for which the map information update has been skipped.

After the map information update is made, offset information 0x350 of the open block related to the map information update process, that is, the last offset information of the updated map information may be stored in the update information (d). The update information (d) may be stored in the buffer memory 140 during operation of the memory system and may also be stored in the memory devices 120 and 120-1 in preparation for power-off in the future.

FIG. 4 illustrates a situation in which the outside 130 generates a write command to the memory system 100 in a fourth write sequence Sequence 4 subsequent to FIG. 3 and external data is stored up to the last offset of the open block OBLK.

Specifically, after the first write sequence Sequence 1 to the third write sequence Sequence 3 are executed and the external data is stored up to the 0x350 offset of the open block OBLK in the memory system 100 as illustrated in FIG. 3, the outside 130 may generate a write command including the last offset to the memory system 100 in the fourth write sequence Sequence 4. The memory controller 110 may store the external data up to the last offset within the open block OBLK on the basis of the write command according to the fourth write sequence Sequence 4. The open block OBLK may include a plurality of pages, and the last offset of the open block OBLK may be a last page of the open block OBLK.

After storing the data up to the last offset, the memory controller 110 may determine that a map information update is required regardless of whether write data generated up to the last offset after the offset 0x350 is a sequential pattern. When the write data of the fourth write sequence Sequence 4 is stored up to the last offset of the open block, the memory controller 110 may perform a map information update operation. In such a case, the memory controller 110 may update all map information on external data, for which no map information update has been made, by referring to the skip information (c). That is, when data is stored up to the last offset of the open block, the memory controller 110 in accordance with an embodiment of the present technology may perform map information update regardless of the pattern of write data and manage an offset Last offset of the open block related to the map information update process by the update information (d).

Figure 5:
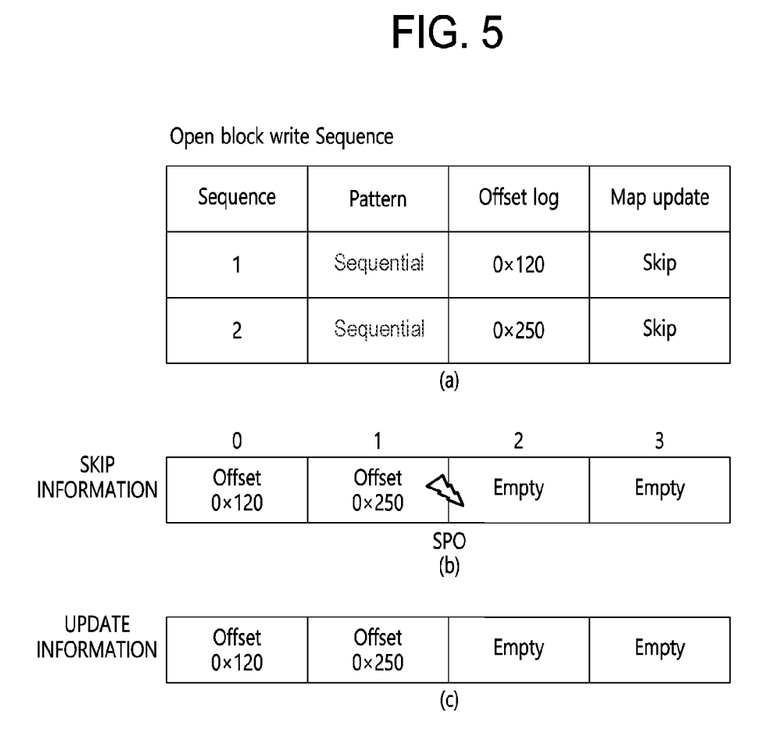
FIG. 5 is a diagram for explaining map information update according to offset information during sudden power off recovery (SPOR) in accordance with an embodiment.
Figure 6:
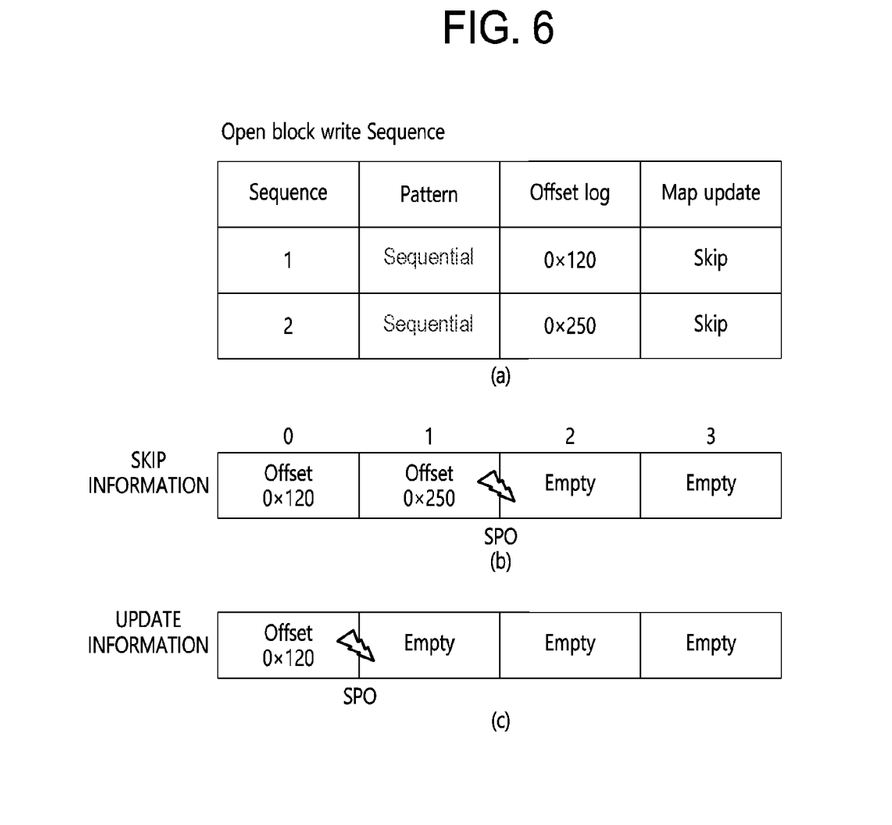
FIG. 6 is a diagram for explaining map information update according to offset information during SPOR in accordance with an embodiment.

FIG. 5 and FIG. 6 are diagrams for explaining map information update according to offset information during SPOR in accordance with an embodiment.

Referring to FIG. 5, as shown in (a), the outside 130 processes a write request corresponding to a sequential pattern to the memory system 100 through the first write sequence Sequence 1 and the second write sequence Sequence 2, and the memory controller 110 stores data up to the offset 0x250 in the open block of the memory device in response to the write request. In the process of storing the data up to the offset 0x250 in the open block, the memory controller 110 stores offset information 0x120 and offset information 0x250 in the skip information (b) in relation to map information update.

After sudden power off (SPO), the memory controller 110 may use the skip information (b) for recovery (SPOR) of external data stored in the open block. When SPO occurs after the offset information 0x250 is stored in the skip information (b), the memory controller 110 may select the offset information 0x120, which is the oldest information included in the skip information (b). The memory controller 110 may use the selected offset information 0x120 to read a logical address stored in all areas of the external data storage area up to the offset 0x120 of the open block, for example, logical block address (LBA) information, construct map information including a logical address of data written up to the offset 0x120 of the open block and a physical address corresponding the logical address, and update the memory device with the constructed map information. The memory controller 110 may store, in the update information (c), the fact that the map information has been updated up to the offset 0x120 of the open block. After storing the update information (c), the memory controller 110 may select the offset information 0x120 lastly stored in the update information (c) and the offset information 0x250 stored at the next point of the offset information 0x120 previously selected in the skip information (b). The memory controller 110 may use the selected offset information 0x250 to read a logical address stored in all the areas of the external data storage area up to the offset 0x250 after the offset 0x120 of the open block, construct map information including a logical address of data written up to the offset 0x250 after the offset 0x120 of the open block and a physical address corresponding the logical address, and update the memory device with the constructed map information. The memory controller 110 may store, in the update information (c), the fact that the map information corresponding to data stored up to the offset 0x250 of the open block has been updated.

FIG. 6 illustrates a situation in which while map information is constructed using the skip information (b) after SPO and is being updated, SPO occurs again.

Specifically, FIG. 6 illustrates the situation in which in FIG. 5, while the offset information 0x120 is stored in the update information (c), next offset information 0x250 is selected from the skip information (b), and then map information for the open block is constructed and is being updated, SPO occurs before the offset information 0x250 is stored in the update information (c) because map information update has not been completed up to the offset 0x250.

In the recovery (SPOR) process after SPO occurs, the memory controller 110 may refer to the skip information (b) and the update information (c) and recognize that map information update has been completed up to the offset 0x120 of the open block and has not been completed up to the offset 0x250 after the offset 0x120. Accordingly, the memory controller 110 may read all areas of data written from the offset 0x120 to the offset 0x250 of the open block, and perform map construction and update related to corresponding data again. In this way, even though SPO occurs during SPOR, the memory controller 110 may shorten a map update process by using the skip information (b) and the update information (c).

Figure 7:
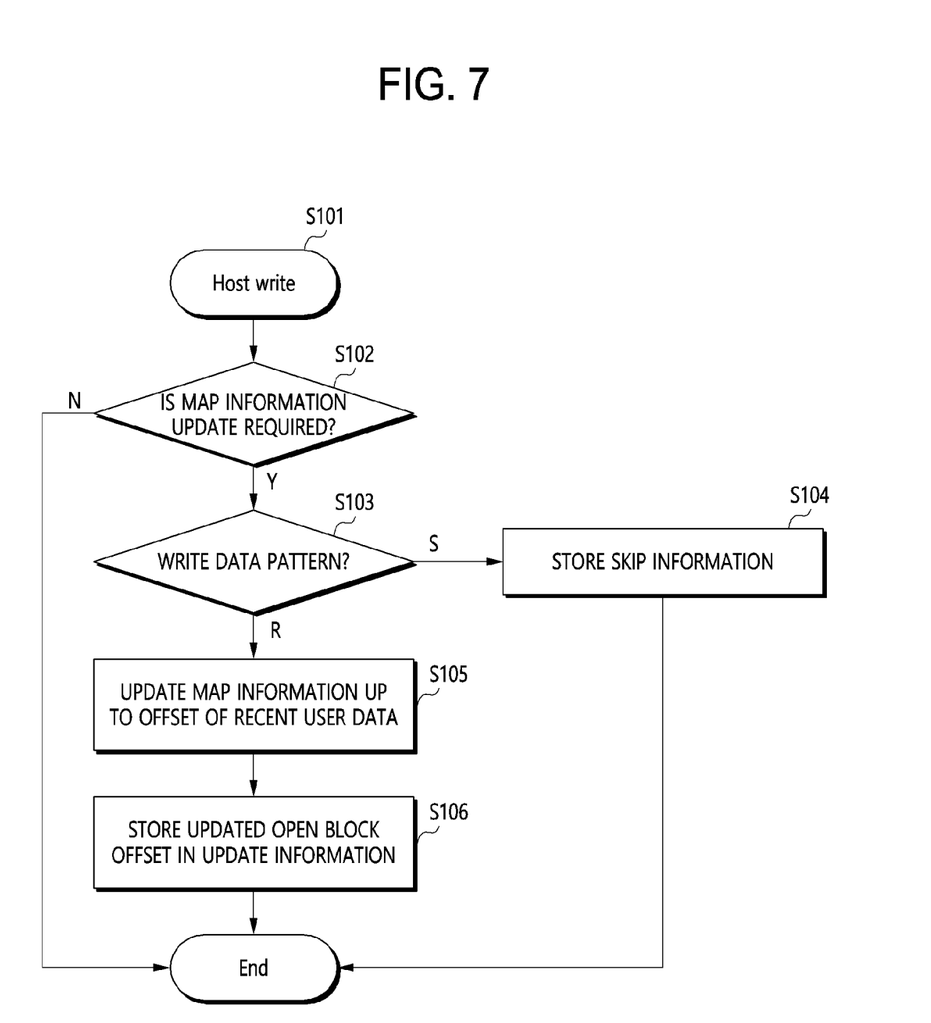
FIG. 7 is a flowchart for explaining an operating method of a data storage device in accordance with an embodiment.

FIG. 7 is a flowchart for explaining an operating method of the data storage device in accordance with an embodiment.

The memory controller 110 of the memory system 100 may receive a write request from the outside 130 or the host and write data in an open block (S101).

The memory controller 110 may determine whether a map information update is required for the data written in the open block, according to a predetermined cycle or a preset map information update condition (S102). The word "preset" as used herein with respect to a parameter, such as a preset map information update condition, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm. The word "predetermined" as used herein with respect to a parameter, such as a predetermined cycle, means that a value for the parameter is determined prior to the parameter being used in a process or algorithm. For some embodiments, the value for the parameter is determined before the process or algorithm begins. In other embodiments, the value for the parameter is determined during the process or algorithm but before the parameter is used in the process or algorithm.

When the map information update is required (S102: Y), the memory controller 110 may determine whether a pattern of the write recently processed in the open block is sequential or random (S103).

When the pattern of the write recently processed is sequential (S103: S), the memory controller 110 may skip map information update and store last offset information, in which data is stored in the open block, in skip information. The skip information may be stored, for example, in a log block area (S104).

When the pattern of the write recently processed is random (S103: R), the memory controller 110 may update not only map information related to external data of a random pattern recently stored in the open block, but also map information not updated among map information related to external data previously stored in the open block (S105).

After the map information update is completed, the memory controller 110 may store, in update information, offset information of an open block related to skip information for which the map information update has been completed (S106).

Figure 8:
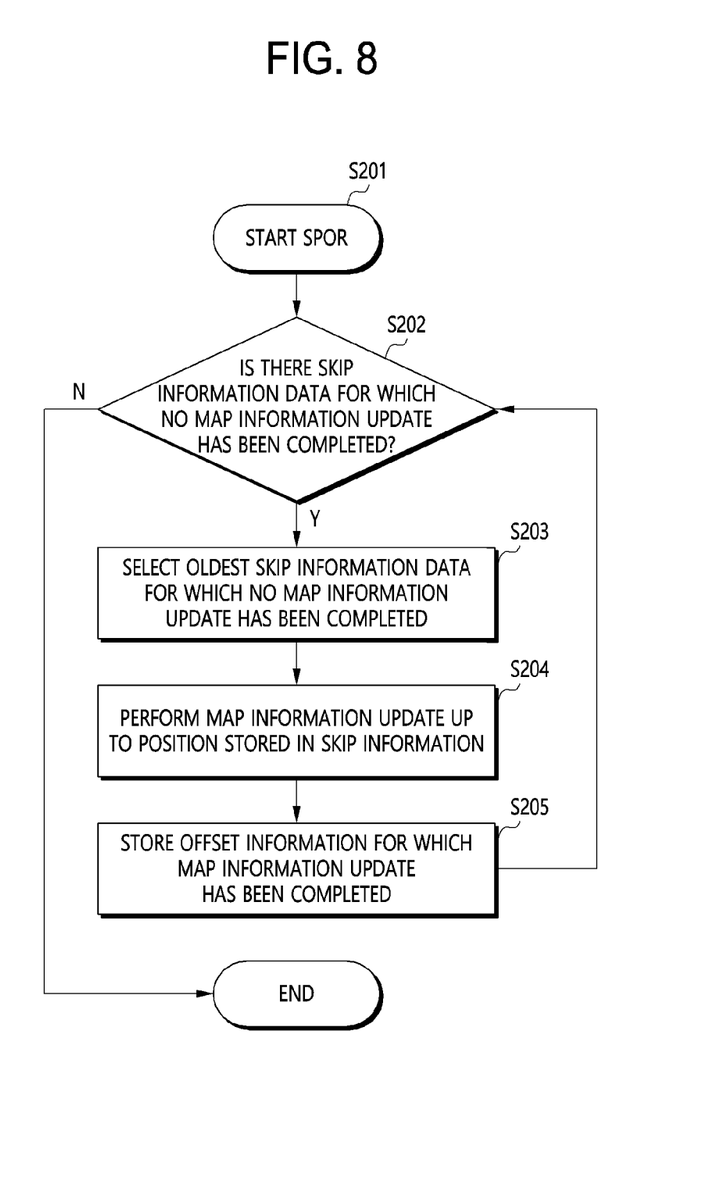
FIG. 8 is a flowchart for explaining an operating method of a data storage device in accordance with an embodiment.

FIG. 8 is a flowchart for explaining an operating method of the data storage device in accordance with an embodiment.

The memory controller 110 of the data storage device may perform a SPOR operation after SPO (S201).

The memory controller 110 may use skip information and update information to determine whether there is skip information for which no map information update of an open block has been completed (S202).

When there is skip information for which no map information update has been completed (S202: Y), the memory controller 110 may select the oldest skip information among the skip information for which no map information update has been completed (S203). When there is no skip information for which no map information update has been completed (S202: N), the operation is closed. In an embodiment, the oldest skip information is skip information stored or generated prior to any other skip information that has been generated or stored.

The memory controller 110 may determine a map information update area related to external data stored in an open block, on the basis of offset information stored in the selected skip information, and perform map information update (S204).

The memory controller 110 may complete the map information update on the basis of the selected skip information, and store, in update information, an offset of the open block for which the map information update has been completed (S205).

Subsequently, the memory controller 110 may return to step S202 and repeat the processes from S202 to S205 until all skip information has been updated.

A person skilled in the art to which the present disclosure pertains can, now after reviewing the present disclosure, understand that the present disclosure may be carried out in other specific forms without changing its technical spirit or essential features. Therefore, it should be understood that the embodiments described above are illustrative in all aspects, not limitative. The scope of the present disclosure is defined by the claims to be described below rather than the detailed description, and it should be construed that all changes or modified forms derived from the meaning and scope of the claims and the equivalent concept thereof are included in the scope of the present disclosure.

What is claimed is:

1. A memory system comprising:
a memory device including a plurality of memory blocks; and
a memory controller configured to receive a write request including a logical address from an outside, to store write data corresponding to the write request in a first memory block among the plurality of memory blocks,
wherein, when a map information update is required and the write request is a sequential write operation, the memory controller is configured to store, in a second memory block, offset information related to a page of the first memory block in which the write data associated with the sequential write operation is lastly stored,
wherein the memory controller in configured to skip updating the map information of the write data associated with the sequential write operation, and
wherein, when a last page of the first memory block is written, the memory controller determines that the map information update is required and skips determining whether a pattern of the write request is the sequential write operation and skips the storing of the offset information.

2. The memory system according to claim 1, wherein the memory controller determines whether the write request is the sequential write operation on the basis of whether the logical address is consecutive or a size of the write data.

3. The memory system according to claim 1, wherein, when the map information update is required and the write request is a random write operation, the memory controller updates a third memory block with map information associated with the random write operation.

4. The memory system according to claim 3, wherein, when map information related to the random write operation is updated, the memory controller updates the third memory block with all non-updated map information which comprises the map information wherein updating was skipped among map information corresponding to the data stored in the first memory block.

5. The memory system according to claim 1, wherein, when a last page of the first memory block is written, the memory controller determines that the map information update is required, and updates a third memory block with all non-updated map information which comprises the map information wherein updating was skipped among map information corresponding to the data stored in the first memory block.

6. The memory system according to claim 1, wherein the second memory block is a block for storing meta data read before an external write request is processed after booting of the memory system.

7. The memory system according to claim 6, wherein the memory controller constructs map information, for which an update related to at least one write data stored in the first memory block has not been completed, on the basis of the offset information during sudden power off recovery (SPOR).

8. The memory system according to claim 1, wherein the memory controller manages meta data indicating whether map information related to the write data has been updated.

9. The memory system according to claim 8, wherein the memory controller updates a third memory block with map information for which an update related to at least one write data stored in the first memory block has not been completed, on the basis of the meta data and the offset information during sudden power off recovery (SPOR), and store a map information updated during the SPOR to the meta data.

10. The memory system according to claim 8, wherein, when there are a plurality of non-updated offset information during sudden power off recovery (SPOR), the memory controller updates a third memory block with map information from the oldest offset information in units of offset information, and store a map information updated during the SPOR to the meta data.

11. An operating method of a memory system, the operating method comprising:
receiving, with a memory controller, a write request including a logical address from an outside;
storing, in the memory controller, write data corresponding to the write request in a first memory block;
determining, with the memory controller, whether a map information update is required for the data stored in the first memory block; and
determining, with the memory controller, a pattern of the write request when the update is required;
wherein, when the pattern of the write request is a sequential write operation, the memory controller stores, in a second memory block, offset information related to a page of the first memory block in which the write data associated with the sequential write operation is lastly stored, and
skips updating the map information of the write data associated with the sequential write operation,
wherein, when a last page of the first memory block is written, the memory controller determines that the map information update is required and skips the determining of the pattern of the write request and skips the storing of the offset information.

12. The operating method according to claim 11, wherein, in determining the pattern of the write request, the memory controller determines that the pattern of the write request is the sequential write operation, on the basis of whether the logical address is consecutive or a size of the write data.

13. The operating method according to claim 11, wherein, when the pattern of the write request is not the sequential write operation, the memory controller skips the storing the offset information, and updates a third memory block with map information corresponding to the data associated with the non-sequential write operation.

14. An operating method of a memory system, the operating method comprising:
skipping, with a memory controller, updating of a map information of a write data associated with a sequential write operation,
storing, with the memory controller, an offset information related to a page of the first memory block that the write data, which is associated with the sequential write operation and the map information update operation is skipped, is lastly stored,
reading, with the memory controller, first recovery information and second recovery information from a memory device in a sudden power off (SPO) recovery process;
determining, with the memory controller, whether an update of map information corresponding to data stored in the first memory block of the memory device has been completed through the first recovery information and the second recovery information;

selecting, with the memory controller, the first recovery information corresponding to data for which the map information update has not been completed, and updating the map information corresponding to the data stored in the first memory block according to the offset information included in the selected first recovery information; and updating, with the memory controller, the map information and storing the updated map information in the second recovery information, wherein, when a last page of the first memory block is written, the memory controller determines that the map information update is required and skips determining whether a pattern of a write request is the sequential write operation and skips the storing of the offset information.

15. The operating method according to claim 14, wherein the second recovery information includes offset information of data corresponding to map information for which the map information update operation has been completed on the basis of the first recovery information among the data stored in the first memory block.

16. The operating method according to claim 14, wherein reading, determining, selecting, and updating, with the memory controller, are repeated until an update of all the map information corresponding to the data stored in the first memory block is completed.

* * * * *